United States Patent
Yang et al.

(10) Patent No.: US 6,841,646 B2
(45) Date of Patent: Jan. 11, 2005

(54) PROCESS FOR PREPARING POLY(UREA-URETHANE)

(75) Inventors: Jeng-Cheng Yang, Tao-Yuan (TW); Chen-Chi Martin Ma, Hsinchu (TW); Hon-Bin Chen, Tao-Yuan (TW); Chin-Yih Chen, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 0 days.

(21) Appl. No.: 10/453,649

(22) Filed: Jun. 4, 2003

(65) Prior Publication Data

US 2004/0097683 A1 May 20, 2004

(51) Int. Cl.$^7$ .................. C08G 18/61; C08G 18/32; C08G 18/10
(52) U.S. Cl. ...................................... 528/28
(58) Field of Search .......................... 528/28

(56) References Cited

U.S. PATENT DOCUMENTS

| | | | |
|---|---|---|---|
| 3,957,724 A | * 5/1976 | Schurb et al. ............. 528/28 |
| 4,076,763 A | * 2/1978 | Thom et al. ............. 525/474 |
| 4,478,893 A | * 10/1984 | Schonfelder et al. ....... 427/387 |
| 4,498,929 A | * 2/1985 | Robertson ............. 106/38.2 |
| 4,504,313 A | * 3/1985 | Robertson ............. 106/38.2 |
| 4,543,398 A | * 9/1985 | Bany et al. ............. 525/474 |
| 4,546,154 A | * 10/1985 | Robertson ............. 525/474 |
| 4,600,751 A | * 7/1986 | Lee et al. ............. 525/404 |
| 4,678,688 A | * 7/1987 | Itoh et al. ............. 427/387 |
| 4,764,330 A | * 8/1988 | Stuber et al. ............. 264/300 |
| 4,935,482 A | * 6/1990 | Decker et al. ............. 528/28 |
| 5,214,119 A | * 5/1993 | Leir et al. ............. 528/28 |
| 5,221,724 A | * 6/1993 | Li et al. ............. 528/28 |
| 5,290,615 A | * 3/1994 | Tushaus et al. ............. 428/41.4 |
| 5,461,134 A | * 10/1995 | Leir et al. ............. 528/14 |
| 5,714,524 A | * 2/1998 | Hara et al. ............. 522/99 |
| 6,310,116 B1 | * 10/2001 | Yasuda et al. ............. 523/106 |
| 6,355,759 B1 | * 3/2002 | Sherman et al. ............. 528/28 |
| 6,407,195 B2 | * 6/2002 | Sherman et al. ............. 528/28 |
| 6,441,118 B2 | * 8/2002 | Sherman et al. ............. 528/28 |
| 6,461,738 B2 | * 10/2002 | Ishikawa et al. ............. 428/447 |

\* cited by examiner

*Primary Examiner*—Rabon Sergent
(74) *Attorney, Agent, or Firm*—Bacon & Thomas

(57) ABSTRACT

A poly(urea-ureathane) based on polydimethyl siloxane is prepared by reacting an amino-terminated polydimethyl siloxane with polyisocyanate to form a prepolymer of poly (urea-urethane), and reacting the prepolymer and a chain extender in the presence of a catalyst. The resulting poly (urea-urethane) contains about 5–65 wt % of hard segments, and has a surface resistance of about 10–150 MΩ at high relative humidity, so that it can be used in anti-static electricity and electrostatic discharge shielding.

3 Claims, No Drawings

PROCESS FOR PREPARING POLY(UREA-URETHANE)

FIELD OF THE INVENTION

The present invention relates to a process for preparing a poly(urea-urethane) (hereinafter referred as PUU) based on polydimethyl siloxane (hereinafter referred as PDMS). The PUU thus prepared can be used in anti-static electricity and electrostatic discharge (ESD) shielding in a high relative humidity environment.

BACKGROUND OF THE INVENTION

Interference between electronic products and components mainly comes from themselves or outside. Their operations in certain degree are affected by interference, and thus it is important as to whether they themselves generate the electronic noises or have a shield to avoid the interference of foreign electronic noises. Noise interferences mainly can be classified into electrostatic discharge (ESD), electromagnetic interference (EMI), and radio frequency interference (RFI). These interferences are highly likely to cause a short circuit or a damage in an electronic component. As the density of the circuits in the electronic component increases, the interference problems become more severe. As a result, the electrostatic or electromagnetic interference shielding is required for more and more electronic products and components.

The uses of conductive polymeric composite materials mainly include four areas according to their conductivity for different resistance requirements, which are:

First is an anti-electrostatic material, second is an ESD shielding material, third is EMI/RFI shielding material, and fourth is a conductive connection material. In general, a polymeric material is a good insulator with a surface resistance of greater than $10^{12}$ $\Omega/cm^2$, and is very easy to have electrical charges agglomerated on the surface thereof. A direct modification to the polymer such as blending the polymer with polyaniline, or an addition of a conductive filler (e.g. conductive carbon black or metal powder) can increase the conductivity of the polymer to reduce the charge agglomeration or enhance transferring of electrical charges. The anti-electrostatic material has a lower rate of charge transfer, which can avoid the charge agglomeration and the occurrence of spark. As the rate of charge transfer is faster, it becomes a conductive polymeric composite material. Usually, a polymeric material is blended with a conductive filler or an antistatic agent to achieve antistatic or EMI shielding effects.

The conductance of an ordinary material, according to its surface resistance, can be classified into the following: high conductivity, static electricity dissipation, and antistatic. (1) A conductive material for EMI/RFI shielding needs to have a volume resistance of less than 1 $\Omega \cdot cm$, as well as be applicable in electrostatic protection at a high voltage. (2) A material with a surface resistance of $10^5-10^9$ $\Omega/cm^2$ is defined as an static electricity dissipation material and is often used in the protection of short circuit for an electronic facility liable for static electricity agglomeration or electric arc formation. Its static electricity dissipation rate is slightly lower than that of a conductive material, and such a material is often used as a packaging material or an operation tool. (3) A material with a surface resistance of $10^9-10^{12}$ $\Omega/cm^2$ is an antistatic material, which provides an ESD protection or antistatic property at a low voltage, and is often used as a packaging material.

A human body and materials such as plastics, synthetic fibers, and glass fibers, are easy to generate high voltage static electricity, for example, a plastic material, during its use, production, and transportation processes, is easy to generate static electricity. The formation of static electricity can be prohibited by the addition of a conductive carbon black or an antistatic amine additive. An amine or other antistatic agent also plays other roles, such as a lubricant, and a mold release agent, etc.

There are two types of antistatic mechanisms: one is lubricating effect, i.e. reducing the frictional force; the other is the conduction of static charges or absorption of moisture, allowing the charges to disappear in the atmosphere, thereby achieving the antistatic effect. Generally speaking, the most popular additives of antistatic material are amines, amine salts, and polyvinyl alcohol. The main antistatic mechanism of these additives is absorbing moisture in the atmosphere, thereby achieving the antistatic effect.

Several defects of an antistatic agent must be taken into consideration, for examples, carbon black tends to release from the matrix material and form contamination due to wearing off, and an amine antistatic agent usually does not function well in a dry environment. Therefore, currently researches are being carried out on developing permanent type antistatic agents and temperature independent antistatic agents, which will not be significantly affected by moisture and temperature.

SUMMARY OF THE INVENTION

The objective of the present invention is to synthesize a poly(urea-urethane) based on polydimethyl siloxane (abbreviated as PDMS-based PUU) as a permanent type antistatic material. The synthesis method of the present invention uses a chain extender integrated into the synthesized material, which also has an effect equivalent to the conventional addition-type low molecular weight antistatic agent without the migration-to-surface problem of the conventional antistatic agent, and thus avoid a reduction on the antistatic effects.

A process for preparing a PDMS-based PUU according to the present invention comprises:

a) reacting polydimethyl siloxane (abbreviated as PDMS) having two terminal amine groups with an excessive amount of polyisocyanate in an organic solvent to form a solution containing poly(urea-ureathane) prepolymer; and b) reacting the poly(urea-ureathane) prepolymer from step a) with a chain extender in the presence of a catalyst to obtain a solution containing poly(urea-ureathane).

Preferably, said chain extender is selected from a group consisting of ethylene glycol, glycerol, 2,2-bis(hydroxymethyl)propionic acid, ethylene diamine, and a mixture thereof.

Preferably, the poly(urea-ureathane) prepared in step b) contains 25–50 wt % of a soft segment of PDMS.

Preferably, the invented process further comprises introducing the poly(urea-ureathane)-containing solution from step b) into an open mold, and evaporating the organic solvent contained therein to form a poly(urea-ureathane) film, wherein the material of the mold enables a water contact angle of an air-contact face of the poly(urea-ureathane) film being 20–30 degrees smaller than that of a mold-contact face of the poly(urea-ureathane) film. More preferably, the open mold is made of aluminum.

DETAILED DESCRIPTION OF THE INVENTION

Polydimethylsiloxane (PDMS) is an oligomer having a high thermal stability, good impact strength, and high biological compatibility. Since its main chain has a high density of —Si—O— bonding, PDMS has a very high softness and flexibility, and thus a very low Tg (about −120° C.). Poly (urea-urethane) (PUU) synthesized using PDMS as a main chain not only has a good ductility, but also a rather strong impact resistance and, as a result, has a wide range of applications.

Since PDMS has a rather good insulation property and hydrophobicity, its applications in the electronic industry are limited to certain fields. Therefore, the present invention further proposes means for enabling distribution difference of hydrophilicity/hydrophobicity of film to improve the electrical conductivity of a PDMS-based PUU and widen its applications in the electronic industry. That is the PDMS-based PUU film, being hydrophilic on one side and hydrophobic on the other side due to the different silicon contents thereof, can be produced by casting on templates of different materials. The hydrophilic film is used to absorb water molecules in atmosphere to greatly increase the electrical conductivity on the hydrophilic side of the film.

EXAMPLES

Preparation of PDMS-based PUU
Removal of Water from PDMS

PDMS was loaded in a 250 ml round bottom flask. The opening of the flask was connected to a vacuum system for maintaining vacuum in the flask. The flask was mounted in an oil bath and a heating plate was used to heat the PDMS to 120° C. After bubbles no longer floating out of the liquid surface, the heating was continued for a certain period of time until water beads on the wall near the opening of the flask were completely evaporated. After water beads were completely evaporated, the flask was removed from the vacuum system and a molecular sieve was added to further remove moisture. Each time before PDMS was used, it had been subjected to the removed of moisture again.

Preparation of Prepolymer of PUU by Using TDI and PDMS

After drying, PDMS was completely dissolved in THF at 50% w/v ratio in a four-neck flask. Subsequently, the flask was vacuumed and then filled with nitrogen so that the reaction system was in nitrogen. TDI (toluene diisocyanate) was diluted with THF in a 10% w/v ratio and the solution was loaded in a feeder. The flow rate of the TDI/THF solution was controlled so that the feeding of the solution to the flask was completed in one hour. The reaction mixture was heated under refluxing by controlling the temperature at 80° C., while mixing. Every hour, a capillary tube was used to take a sample from the reaction mixture, which was scanned by a FT-IR spectroscopy to monitor the progress of the reaction. During the course of the reaction, the stretching peak of the NCO group at 2270 $cm^{-1}$ in the IR spectrum continued to decrease, and the bending peak of N—H at 1550 $cm^{-1}$ and the stretching peaks of C=O (1640~1660 $cm^{-1}$ being urea, 1710~1740 $cm^{-1}$ being urethane) continued to being stronger and sharper. After the reaction had been carried out for about five hours (or more), the relative ratios of the characteristic absorption peaks of NCO group, the C=O groups and the N—H group were substantially unchanged. The reactions of the terminal groups (amine or hydroxyl) of PDMS with the NCO group were complete, thereby completing the preparation of the prepolymer of PUU.

Completion of Synthesis of PUU by Introducing a Glycol or Diamine Chain Extender into the Prepolymer of PUU The resulting prepolymer was added with a series of different chain extenders and catalyst, stannous 2-ethylhexanoate, to increase its molecular weight. The reaction was carried out under refluxing at 80° C. in a nitrogen atmosphere. The reaction was monitored by an IR spectrum, wherein a continuous decrease of the stretching peak of NCO group was observed until a complete disappearance of NCO group, indicating a completion of the reaction.

The reaction mixture was agitated at room temperature with a maximum rotation speed of the mixer for five hours or more, after the stretching peak of NCO disappeared in the IR spectrum, and the viscosity of the reaction mixture increased dramatically. Upon completion of the agitation, the resulting PUU solution was removed for storage or film casting.

Treatment of Chain Extenders Used in the Synthesis of PUU
Ethylene Glycol

The water removal of ethylene glycol was carried out similarly to the above-mentioned water removal process for PDMS. After the water removal, ethylene glycol was dissolved in THF with ten times of volume, which was added to the prepolymer of PUU slowly by using a feeding tube.

Ethylene Diamine

The water removal of ethylene diamine was carried out similarly to the above-mentioned water removal process for PDMS. After the water removal, ethylene amine was dissolved in THF with 100 times of volume, which was added to the prepolymer of PUU slowly by using a syringe pump or controlled feeding tube, so that the feeding time was controlled to be more than three hours. Since the reaction rate of ethylene diamine was rather fast, the catalyst was not used.

Glycerol

The water removal of glycerol was carried out similarly to the above-mentioned water removal process for PDMS. After the water removal, glycerol was dissolved in THF with ten times of volume, which was added to the prepolymer of PUU slowly by using a feeding tube.

2,2-Bis(hydroxymethyl)propanic acid (abbreviated as DMPA)

A DMPA crystalline powder, after weighing, was dissolved at 30° C. in dimethylformamide (DMF) with 4 times of volume/weight ratio under agitation. Upon completion of dissolution, the bottle was washed with a small amount of THF to remove the DMPA/DMF solution remained on the wall of the bottle.

Film Casting of PUU

The synthesized PUU polymer solution was poured into a film mold of a metal template packed with an aluminum foil, and then placed in a ventilation closet for three hours without evacuation. Then, the evacuation system of the ventilation closet was turned on for about two hours. Thereafter, the film mold was placed in a vacuum oven for vacuuming at 90° C. for six hours to ensure a complete removal of the solvent in the film. In the case of DMPA was used as a chain extender, a vacuuming at 120° C. must be carried out for more than ten hours to ensure a complete removal of DMF solvent.

The oven-dried film was removed from the vacuum oven. The part adhered to the side frame was trimmed off, and the aluminum foil on the back of the film was peeled off.

Measurement of Molecular Weight (GPC)

The calculation of the solid content in the PUU solution was carried out. The original PUU solution was diluted with THF to 0.5% weight percentage solid according to the calculated solid content. The resulting diluted PUU solution was filtered and injected into a GPC for a testing of the relative molecular weight.

The group using DMPA as a chain extender, due to the presence of DMF in the solution, needed to be made into a film first and then dried completely. The film was used to prepare a 0.5% PUU/THF solution for GPC injection.

Test of Water Contact Angle

A PUU film specimen was cut into about 0.5 cm×0.5 cm. The film surface was evenly adhered to a sample machine. During each measurement, about $10^{-6}$ ml of water was dripped and a microscope was used to observe the interior angle of the contact angle between one side of the film and the surface of the water drop, and the readings were recorded. Each reading must be completed within 30 seconds after water was dripped on one side of the film. Furthermore, the time interval between the time a water drop was dripped on the film and the reading time must be fully consistent for each measurement in order to obtain accuracy results. The water contact angle was measured for both sides of the film.

Test of Surface Conductivity

The PUU film specimen was cut into a size of 1 cm² and measured for its surface conductivity after drying at 110° C., at 70%, 85%, and 100% relative humidity.

Results of Molecular Weight

Tables 1 and 2 listed the number average molecular weight (Mn), weight average molecular weight (Mw) and polydispersity (PDI) of a PDMS-based PUU using ethylene glycol as a chain extender. Along with a variation in the proportion of the rigid segments, Mn is between about 7500 to about 11500, and PDI in this range was irregular.

moisture absorption. Measuring the water contact angle on the surface of a material is an important evaluation on the hydrophilicity/hydrophobicity of the surface of a material. Due to the difference in the film-contact surfaces during film casting (e.g. air and aluminum foil), the distribution of the soft/rigid chain segments on the two sides of the film are different. This compositional difference causes a different hydrophilicity/hydrophobicity on the two sides of the PUU film. Table 3 shows the water contact angle on the two sides of the PDMS-based PUU film.

It can be seen from Table 3 that the differences between the two water contact angles of the aluminum-contact sides and air-contact sides are about 30 degrees. Furthermore, the water contact angle decreases along with an increase of the mole ratio of the chain extender/PDMS. Since the ratio of NCO/total OH or $NH_2$ was kept at 1.1 during the reaction, the weight ratio of the rigid chain segment in the PUU also

TABLE 1

Mn, Mw and PDI (Mw/Mn) for PUU of PDMS2500-ethylene glycol

| | Rigid chain segment (wt %) | | | | | | | |
|---|---|---|---|---|---|---|---|---|
| | 7.11 | 15.10 | 27.57 | 36.84 | 40.01 | 49.72 | 56.39 | 59.93 |
| Mn | 10241 | 9873 | 8769 | 9487 | 12454 | 7823 | 7283 | 8144 |
| Mw | 25134 | 222390 | 18913 | 24442 | 26593 | 20062 | 17968 | 21127 |
| PDI | 2.4543 | 2.2678 | 2.1568 | 2.5764 | 2.1353 | 2.5646 | 2.4672 | 2.5943 |

TABLE 2

Mn, Mw and PDI (Mw/Mn) for PUU of PDMS4000-ethylene glycol

| | Rigid chain segment (wt %) | | | | | | | |
|---|---|---|---|---|---|---|---|---|
| | 4.56 | 10.00 | 19.22 | 26.78 | 32.94 | 38.20 | 44.69 | 48.31 |
| Mn | 7934 | 7596 | 10112 | 9273 | 8122 | 11836 | 8793 | 9137 |
| Mw | 17932 | 15530 | 21820 | 21111 | 19310 | 297269 | 23516 | 267548 |
| PDI | 2.2602 | 2.0444 | 2.1578 | 2.2766 | 2.3773 | 2.5114 | 2.6764 | 2.9281 |

Results of Contact Angle

In general, the hydrophilicity/hydrophobicity on the surface of a material can be used as an index in the degree of increases along with an increase in the amount of the chain extender, such that the surface hydrophilicity becomes better and the surface water contact angle greatly decreases.

TABLE 3

Contact angle of PDMS-based PUU

| | | Ratio of chain | Contact Angle (°) | | | | | | | |
|---|---|---|---|---|---|---|---|---|---|---|
| | | extender/PDMS | 0 | 1 | 3 | 5 | 7 | 9 | 12 | 14 |
| PDMS4000-ethylene glycol | aluminum contact face | | 125.0 | 120.0 | 125.0 | 113.0 | 105.0 | 109.0 | 94.0 | 92.0 |
| | air contact face | | 88.5 | 85.0 | 90.5 | 80.0 | 71.5 | 59.5 | 61.5 | 64.0 |
| PDMS2500-ethylene glycol | aluminum contact face | | 114.0 | 102.0 | 94.5 | 95.0 | 97.0 | 99.0 | 96.5 | 95.5 |
| | air contact face | | 88.0 | 88.5 | 87.0 | 83.5 | 73.5 | 63.0 | 62.0 | 57.0 |
| PDMS2500-glycerol | aluminum contact face | | 114.0 | 114.5 | 110.0 | 106.0 | 98.0 | 94.0 | 92.0 | 95.5 |
| | air contact face | | 88.0 | 85.5 | 82.5 | 77.0 | 72.5 | 63.0 | 66.5 | 53.0 |
| PDMS2500-DMPA | aluminum contact face | | 114.0 | 100.0 | 99.0 | 96.0 | 91.0 | 88.0 | 76.0 | 77.0 |
| | air contact face | | 88.0 | 81.0 | 74.5 | 64.5 | 62.0 | 58.0 | 54.5 | 48.0 |
| PDMS2500-ionized DMPA | aluminum contact face | | 114.0 | 101.0 | 107.0 | 96.0 | 89.0 | 79.0 | 71.0 | 66.0 |
| | air contact face | | 88.0 | 83.0 | 64.0 | 56.0 | 57.0 | 49.0 | 43.5 | 38.5 |

Results of Surface Conductivity

The antistatic films prepared according to the above examples use the polar or ionized functional groups on the surface of the material to absorb moisture in atmosphere, and thus the surface conductivity thereof is greatly affected by the environmental humidity. The surface impedances of the PDMS-based PUU films prepared according to the above examples were measured after they had been subjected to a series of treatments at different relative humidities. In the case where the films was heated at 80° C. at a reduced pressure for 48 hours, the surface impedances thereof ranged from $100\text{--}450 \times 10^{12}$ $\Omega$ due to dryness. It is believed that the dry film surface is liable to accumulate electric charges, which are difficult to dissipate. In the case where the films were treated in a relative humidity of 70%, 85%, and 100% for 48 hours, the dissipation of surface charges is greatly improved due to the moisture absorption on the film surfaces. After a constant humidity and constant temperature treatment, the surface impedances of the films decrease for about five orders to about $10^9$ $\Omega$, i.e. the conductance increasing for about five orders of magnitude.

What is claimed is:

1. A process for preparing a polydimethyl siloxane-containing poly(urea-urethane) comprising the following steps:

a) reacting polydimethyl siloxane having two terminal amine groups with an excessive amount of polyisocyanate in an organic solvent to form a solution containing poly(urea-urethane) prepolymer; and b) reacting the poly(urea-urethane) prepolymer from step a) with a chain extender in the presence of a catalyst to obtain a solution containing poly(urea-urethane);

introducing the poly(urea-urethane)-containing solution into an open mold, and evaporating the organic solvent contained therein to form a poly(urea-urethane) film, wherein said mold is made of aluminum enabling a water contact angle of an air-contact face of the poly(urea-urethane) film being 20–30 degrees smaller than that of a mold-contact face of the poly(urea-urethane) film.

2. The process according to claim 1, wherein said chain extender is selected from a group consisting of ethylene glycol, glycerol, 2,2-bis(hydroxymethyl)propionic acid, and a mixture thereof.

3. The process according to claim 1, wherein, based on the weight of the poly(urea-urethane), the poly(urea-urethane) prepared in step b) contains 25–50 wt % of a soft segment of polydimethyl siloxane.

* * * * *